(12) United States Patent
Tuomikoski

(10) Patent No.: US 11,231,087 B2
(45) Date of Patent: Jan. 25, 2022

(54) PIECE OF CHAIN

(71) Applicant: FINNCHAIN OY, Rauma (FI)

(72) Inventor: Pekka Tuomikoski, Rauma (FI)

(73) Assignee: FINNCHAIN OY, Rauma (FI)

(*) Notice: Subject to any disclaimer, the term of this patent is extended or adjusted under 35 U.S.C. 154(b) by 245 days.

(21) Appl. No.: 16/488,344

(22) PCT Filed: Jan. 11, 2018

(86) PCT No.: PCT/FI2018/050017
§ 371 (c)(1),
(2) Date: Aug. 23, 2019

(87) PCT Pub. No.: WO2018/167356
PCT Pub. Date: Sep. 20, 2018

(65) Prior Publication Data
US 2020/0011399 A1  Jan. 9, 2020

(30) Foreign Application Priority Data
Mar. 14, 2017 (FI) .................................... 20175227

(51) Int. Cl.
B65G 17/38 (2006.01)
F16G 13/07 (2006.01)
B65G 19/20 (2006.01)
F16G 15/12 (2006.01)

(52) U.S. Cl.
CPC ............ F16G 13/07 (2013.01); B65G 17/38 (2013.01); B65G 19/20 (2013.01); F16G 15/12 (2013.01)

(58) Field of Classification Search
None
See application file for complete search history.

(56) References Cited

U.S. PATENT DOCUMENTS 3,595,011 A * 7/1971 Nicholson ............... F16G 13/07
                                                  59/8
4,272,952 A   6/1981 Graham
(Continued)

FOREIGN PATENT DOCUMENTS

CN       102817963 B    8/2014
CN       204692457 U    10/2015
(Continued)

OTHER PUBLICATIONS

International Search Report and Written Opinion in corresponding International Application No. PCT/FI2018/050017 dated Apr. 18, 2018 (11 pages).
(Continued)

Primary Examiner — Kavel Singh
(74) Attorney, Agent, or Firm — Venable LLP; Jeffri A. Kaminski

(57) ABSTRACT

A piece of chain for use in a metal-constructed chain is composed of pieces of chain made up of lengthwise parallel side plates and connectible successively to each other by link pins at pivot points included in linking portions present at what are the opposite ends in its longitudinal direction. The chain is operated by a drive assembly whereby in association with a bearing surface, present in a midsection of the chain-constructing piece of chain, is provided a notch substantially transverse relative to the chain traveling direction and including a recess comprising a leading edge and a trailing edge, and being, when the chain is being driven, in cooperation with substantially transverse mating surfaces included in the sprocket consistently with the successive notches of the chain. The piece of chain includes a back or edge member connecting its opposite side plates, and a supplementary arrangement coupled in connection therewith.

7 Claims, 6 Drawing Sheets

(56) References Cited

U.S. PATENT DOCUMENTS

Figure 1:
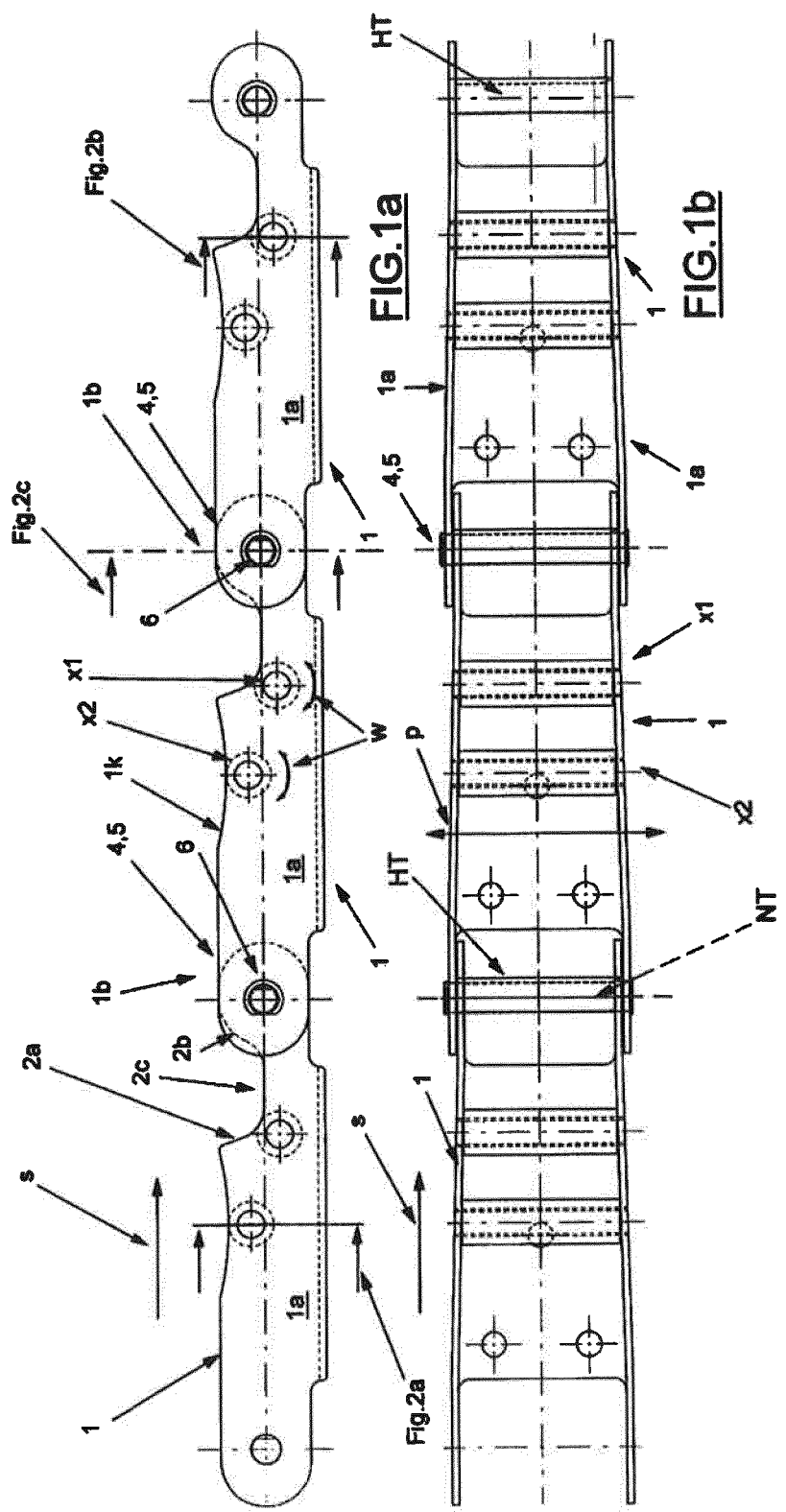

| | | | |
|---|---|---|---|
| 5,038,556 A | | 8/1991 | Moritz et al. |
| 5,722,530 A | * | 3/1998 | Gunschera .............. B41F 21/08 |
| | | | 198/803.7 |
| 7,464,810 B2 | * | 12/2008 | Vietoris .................. F16G 13/02 |
| | | | 198/850 |
| 8,491,430 B1 | | 7/2013 | Swartz |
| 2010/0069188 A1 | | 3/2010 | Adachi et al. |
| 2012/0065012 A1 | | 3/2012 | Klabisch et al. |

FOREIGN PATENT DOCUMENTS

| | | |
|---|---|---|
| EP | 3105471 A1 | 12/2016 |
| FI | 64707 B | 8/1983 |
| FI | 101098 B | 4/1998 |
| JP | 2012232851 A | 11/2012 |
| JP | 5980169 B2 | 8/2016 |
| WO | 9739257 A1 | 10/1997 |
| WO | 2015121531 A1 | 8/2015 |

OTHER PUBLICATIONS

Second Written Opinion in corresponding International Application No. PCT/FI2018/050017 dated Feb. 20, 2019 (5 pages).
International Preliminary Report on Patentability in corresponding International Application No. PCT/FI2018/050017 dated Apr. 3, 2019 (8 pages).
Extended European Search Report in corresponding European Application No. 18766616.9 dated Dec. 1, 2020 (7 pages).

\* cited by examiner

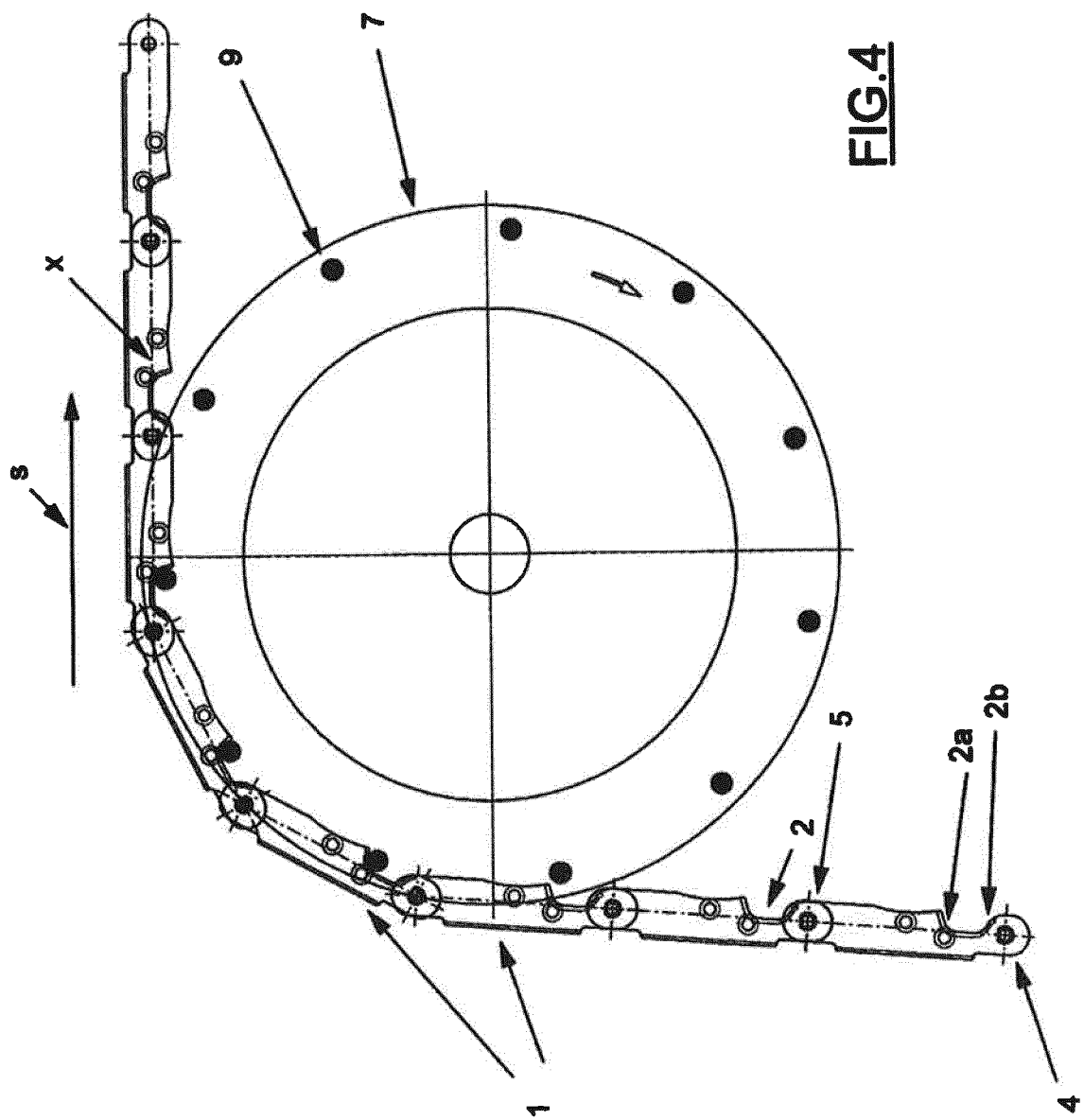

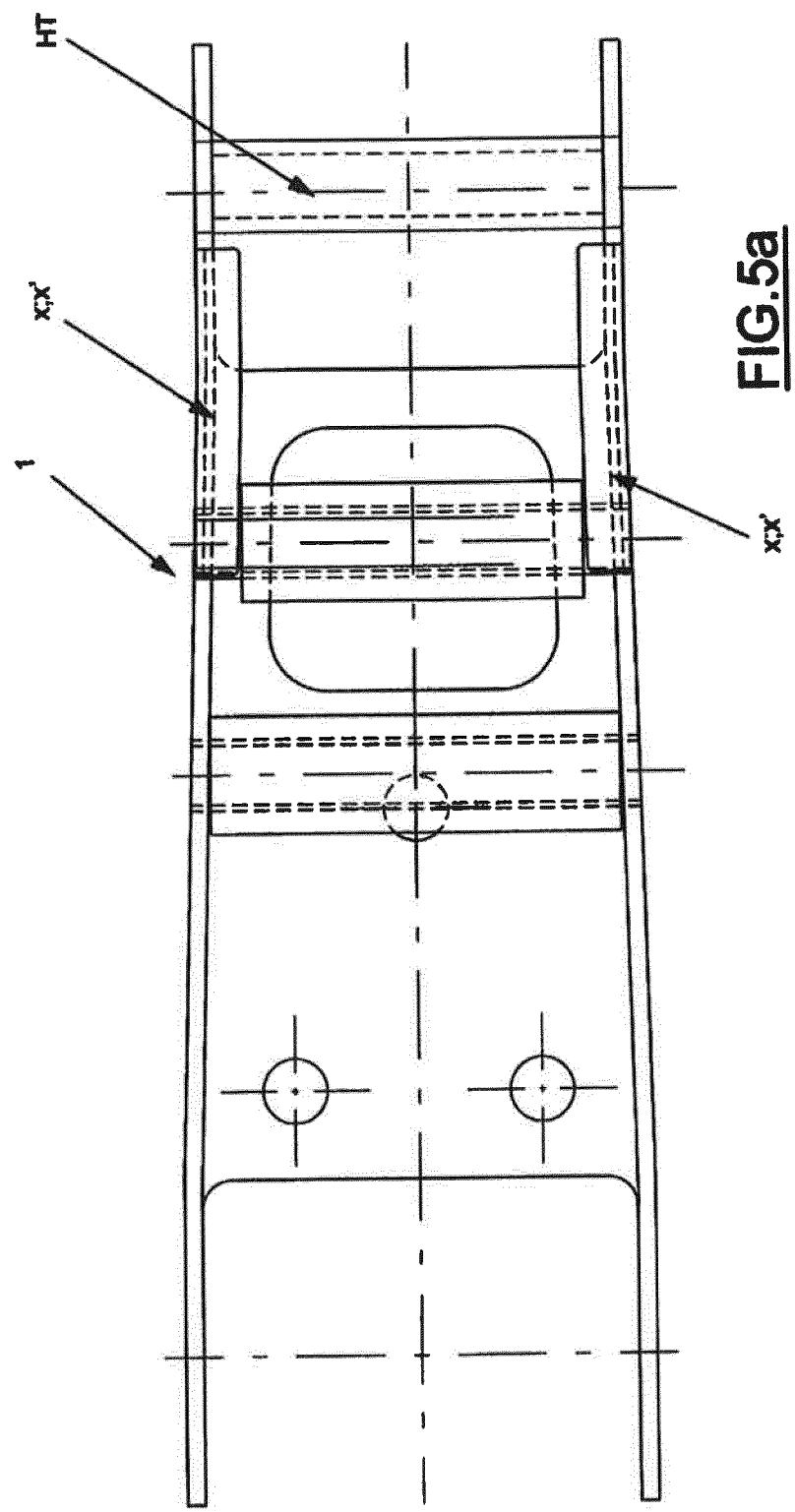

PIECE OF CHAIN

CROSS-REFERENCE TO RELATED APPLICATIONS

This application is a U.S. National Stage application of PCT/FI2018/050017, filed Jan. 11, 2018 and published on Sep. 20, 2018 as WO/2018/167356, which claims the benefit of Finnish Patent Application No. 20175227, filed Mar. 14, 2017, all of which are hereby incorporated by reference in their entireties.

The invention relates to a piece of chain according to the preamble of an independent claim directed thereto.

In traditional chain construction, power transmission in a chain drive is generally conveyed by means of a sprocket which is standardized in terms of its tooth formations. A chain construction more advanced in this respect has been disclosed earlier e.g. in Finnish patents FI 64707 and FI 101098. The chains presented in these patents consist of shaped parts connectible successively to each other by the pivot points thereof and having the bearing surface thereof provided with a notch transverse relative to the chain traveling direction and located preferably in the proximity of a second pivot point in the shaped part.

Thus, as the chain is deflecting onto a sprocket, there will be formed an advantageous lever arm by virtue of which the chain notches are pressed against the sprocket pins more firmly by a chain force exerted on the chain construction. This solution reduces remarkably so-called skipping. Besides, by virtue of the resulting lever arms, the chain construction disengages on a return side easily from the sprocket, thus preventing its so-called dragging along.

Specifically, by virtue of lever arms generated therein, the chain construction according to patent FI 64707 has in practice proved to be remarkably better than similar prior known solutions. However, in chain constructions used at specific operating sites, such as in water treatment plants, it has been necessary to adopt plastic or the like non-metallic materials e.g. for reducing corrosion and the specific weight of a chain. Consequently, in certain operating environments, such as e.g. in particularly acidic conditions, problems have been found in relation to the durability of a plastic material in shaped parts.

Attempts have been conventionally made to improve the tensile strength and flexural rigidity of shaped parts by increasing the material thickness of shaped parts at the notch thereof on a side opposite to the bearing surface, which is not in all instances optimally implementable from the functional standpoint of a chain drive. This is primarily a result of the fact that the increased distance of the back of a shaped part from a center line defined by chain link pins presents problems especially in controlling the movement of a chain and monitoring its running, i.e. in the operation of e.g. so-called chain guards.

On the other hand, it is most beneficial that the depth of a notch present in a shaped part is adapted to extend in the shaped part substantially to the chain's center line so as to enable optimal power transmission between the chain-driving sprocket and the chain's shaped parts. Thereby is provided an optimal chain implementation in terms of construction, as well as its operation without excessive fluctuation and vibration.

However, the chains consisting of currently available shaped parts are not capable of providing a satisfactory solution to the foregoing problems because of both chemical and mechanical properties required of shaped parts used especially in acidic conditions or e.g. in seawater treatment, the fulfillment of said requirements by utilizing plastic materials conventionally used in the discussed purpose having been found unreliable in practice.

For the above-stated reasons, there are at this moment in the above-mentioned service, as presented e.g. in patent JP 5980169 (JP 2014-231883), steel-constructed pieces of chain used the same way as the above-explained plastic-constructed shaped parts, i.e. provided with transverse drive notches yet capable of being assembled according to per se traditional technology by using separate side plates with link pins.

The use of such pieces of chain involves a number of practical problems, firstly because of severe wearing caused by the side plates thereof on drive and deflection pulleys, which increases excessively the chain drive maintenance and upkeep demand. On the other hand, a piece of chain constructed with separate side plates requires extremely precise manufacturing tolerances and special tools in the attachment of link pins, the chain drive running a risk of breaking the chain because of a dislodged link pin, resulting always in awkward and lengthy downtimes.

It is an objective of the piece of chain according to the present invention to provide a decisive improvement over the foregoing problems and to thereby raise substantially the available prior art. In order to attain this objective, the piece of chain according to the invention is principally characterized by what is presented in the characterizing clause of an independent claim directed thereto.

Among the most important benefits gained by a piece of chain of the invention should be mentioned the simplicity and operating reliability of a chain drive and constructions provided thereby, enabling the chain-constructing pieces of chain to be optimized in terms of both chemical and strength/durability properties thereof by using each time a metal material most appropriate in the manufacture of pieces of chain. It is by virtue of the invention that the operation of a chain consisting of the pieces of chain is also made optimal as a beneficial result of its low maintenance and upkeep demand while minimizing the consumption of material in its manufacture by fabricating the pieces of chain preferably e.g. from thin sheet steel by bending. It is by virtue of a piece of chain of the invention that both the manufacturing of pieces of chain and the assembling of a chain can be remarkably simplified as all pieces of chain included therein are complementary in shape, the connection and disconnection of pieces of chain to and from each other being readily implementable also e.g. at a chain operating site without special tools.

The invention also enables the notch in a piece of chain to be placed more easily than in traditional solutions essentially on a center line of the chain without the need of distancing e.g. the back surface of the piece of chain, in a manner typical of plastic pieces, with respect to the back surface of an "unnotched" segment thereof. Likewise, by virtue of preventing vibration of the chain, it is also possible to increase significantly the longevity of an entire chain drive assembly.

It is a further utilization of the pieces of chain preferably with a curved bearing surface that enables en effective expansion of the contact surface between the mutual bearing surfaces of chain-constructing successive shaped parts and a deflection or drive pulley in such a way that no vibration-inducing moment is generated by the pivot points, either. It is naturally possible that, in a chain capable of being assembled from pieces of chain of the invention, further use will be made of e.g. continuously conical link pins, which further contribute simultaneously to minimizing the chain deflection.

Other preferred embodiments for a piece of chain according to the invention are presented in dependent claims directed to a piece of chain.

Figure 2:
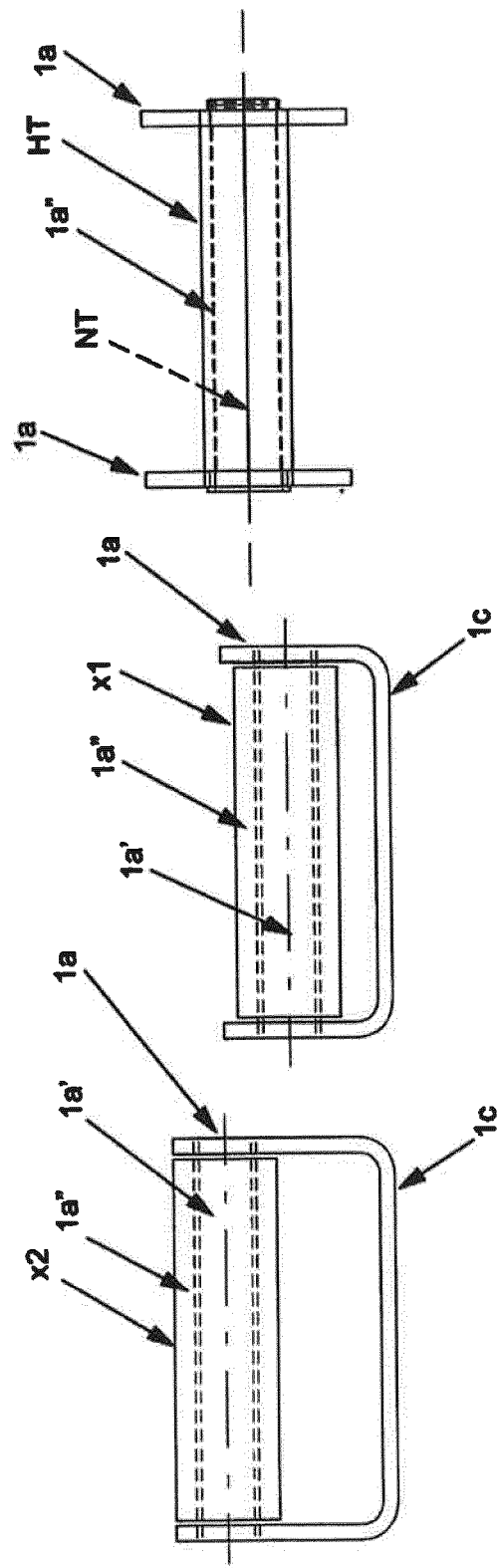
Figure 3:
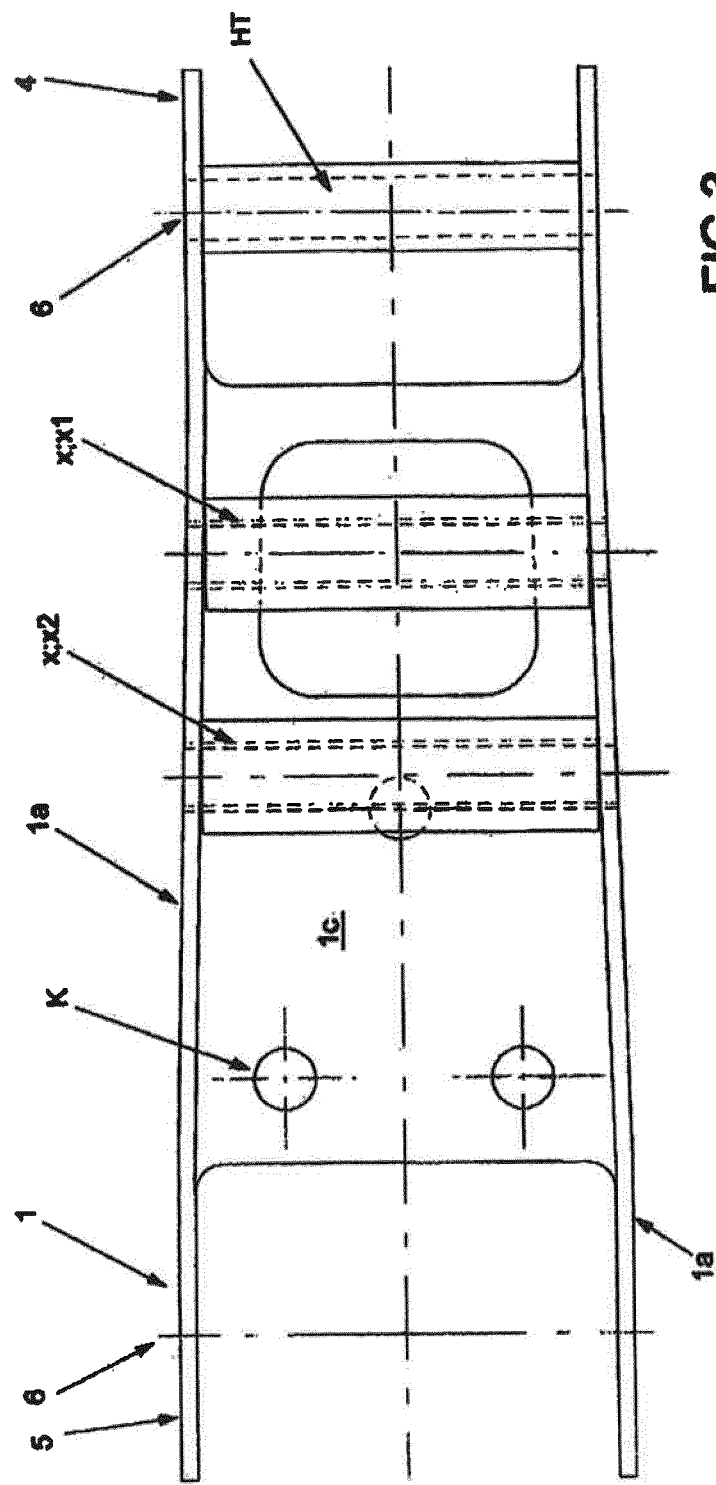
Figure 5B:
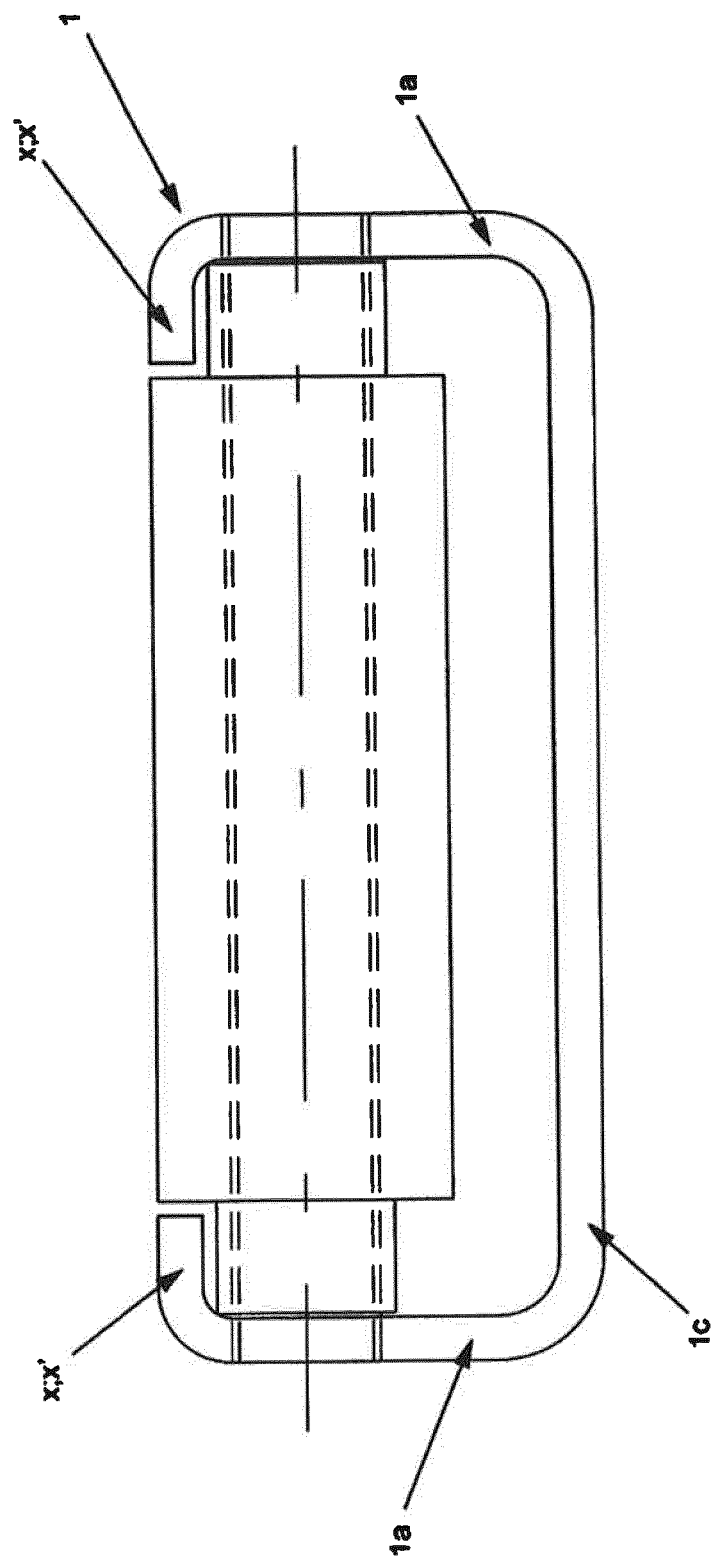

A detailed description of the invention will be presented in the subsequent specification with reference to the accompanying drawings, in which FIGS. 1a and 1b show a side view and an overhead view of one preferred piece of chain according to the invention, FIGS. 2a-2c show enlarged cross-sectional views of details depicted in FIG. 1a, FIG. 3 shows an overhead view of a piece of chain fitted with exemplary attachment systems, FIG. 4 shows how a chain consisting of pieces of chain of the invention is deflecting upon a sprocket, and FIGS. 5a and 5b show a preferred embodiment for one supplementary arrangement present in a piece of chain of the invention in an overhead view and in an enlarged cross-sectional view at a notch of the piece of chain.

The invention relates to a piece of chain for use in a metal-constructed chain, such as a power transmission, conveyor chain and/or the like. In particular reference to FIGS. 1a, 1b and 4, the chain is composed of pieces of chain 1 made up of lengthwise parallel side plates 1a and connectible successively to each other by link pins at pivot points 4, 5 included in linking portions 1b present at what are the opposite ends in its longitudinal direction s. The first pivot point established by the linking portions 1b of the side plates 1a of pieces of chain is a protrusion structure 4, and the second pivot point is a yoke structure 5 external with respect to the protrusion structure when viewed in a transverse direction p. Each pivot point 4, 5 has a hole 6 for constructing a continuous chain by placing the protrusion structure 4 of a preceding piece of chain into engagement with the yoke structure 5 of a following piece of chain with a lap joint and by placing a link pin NT in the hole 6. The chain is intended to be operated by a drive assembly which includes, with particular reference to FIG. 4, at least one sprocket 7 such as a drive, deflection pulley or the like. In association with a bearing surface 1k, present in a midsection of the chain-constructing piece of chain 1, is provided a notch 2 substantially transverse p relative to the chain traveling direction and consisting of a recess 2c comprising a leading edge 2a and a trailing edge 2b, and being, when the chain is being driven, in cooperation, as shown in FIG. 4, with substantially transverse p mating surfaces 9 included in the sprocket 7 consistently with the successive notches 2 of the chain. The sheet metal-constructed side plates 1a of a piece of chain make up an integral construction by way of a back member 1c connecting the same on a side opposite to the bearing surface 1k of the piece of chain and/or by way of an edge member connecting the linking portions 1b of one end thereof (which is not shown in the drawings), in addition to which the piece of chain 1 includes, in particular reference to FIGS. 1b, 2a-2c, 5a and 5b, a supplementary arrangement x coupled in connection with its opposite side plates 1a for improving the wear resistance of a chain drive, implemented with a chain composed of the pieces of chain, by reducing the friction and/or the surface pressure between the piece of chain 1 and the mating surfaces 9 of the sprocket 7.

In a preferred embodiment for a piece of chain of the invention, its protrusion structure 4 comprises a link bushing NH fastened fixedly, most preferably by welding, to the opposite side plates 1a for coupling successive pieces of chain to each other by means of a link pin NT capable of being rotatably engaged through the link bushing and locked to the yoke structure 5 immovably in a transverse direction P. Thus, being fixedly secured to the side plates 1a, the link bushing first of all reinforces a so-called box frame of the piece of chain, in addition to which it enables easy installation and locking of the link pin NT to the yoke structure of another piece of chain, e.g. with a cotter pin, a circlip or the like, without special tools needed e.g. in the making of an interference joint.

In a further preferred embodiment for a piece of chain of the invention, the supplementary arrangement x, specifically for reducing surface pressure between the piece of chain 1 and the mating surfaces 9 of the sprocket 7, comprises a contact surface x' included in the opposite side plates 1a at the notch 2 and expanded in a direction p substantially perpendicular to the side plate, which contributes to the durability of a chain drive by also stiffening the piece of chain's side plates 1a.

In a further preferred embodiment for a piece of chain of the invention, the piece of chain has its side plates 1a, back member 1c, edge member and/or contact surface x' constructed as a one-piece structure from thin sheet metal by bending. The sufficient wall thickness for a piece of chain to be fabricated from sheet by bending is in practice, depending on a size of the piece of chain, e.g. within the range of 1 mm to 6 mm. The pieces of chain may have a width varying in practice e.g. within the range of 40 mm to 120 mm, a height e.g. within the range of 40 mm to 60 mm, and a length e.g. within the range of 100 mm to 500 mm.

In a preferred embodiment for a piece of chain of the invention, the supplementary arrangement x, especially for reducing friction between the piece of chain 1 and the mating surfaces 9 of the sprocket 7, comprises, in reference e.g. to FIGS. 1b. 2a-2c, 3 and 5a, one or more rollers substantially equal in width to an interval transverse p between the piece of chain's side plates 1a, rotatable w around the longitudinal axes thereof, and extending to engagement with the top edge of a substantially respective part of the side plates.

In a further preferred embodiment of the invention, referring particularly to FIGS. 1b and 5a, the supplementary arrangement x comprises one or more rotatable rollers x1 present in association with a leading edge 2a of the notch 2 in a piece of chain. By such positioning of the roller at where the piece of chain is most exposed to wearing, there is provided a decisive reduction of wear exerted both on the mating surfaces or drive pins 9 of the sprocket 7 and on the tooth notch 2 of the pieces of chain. In addition, the disengagement of a piece of chain from a sprocket pin is improved, thereby contributing to the reduction of wear.

In a preferred embodiment of the invention, the supplementary arrangement x further comprises one or more rotatable rollers x2 present in association with the piece of chain's bearing surface 1k. For its part, this roller carries the chain together with the side plates of a piece of chain, by virtue of which the chain wearing and e.g. groove formations on the deflection pulley will be decisively reduced and the disengagement of a chain from a sprocket will be improved as well.

By virtue of the above-mentioned rollers it is also possible to contribute to the structural stiffening of a piece of chain in such a way that the material thickness used therein can be minimized.

In a further preferred embodiment, the supplementary arrangement x has its one or more rollers, which are rotatable w around the longitudinal axes thereof, comprising a surface section 1a" provided in a slide bearing-mounted manner on a shaft 1a' which is fixedly connected to the side plates 1a. In an embodiment optional in this context, the discussed roller may also comprise a surface section 1a" provided on a shaft 1a' which is rotatably connected to the side plates 1a. The above-mentioned surface sections 1a" are fabricated preferably from a plastic- or rubber-based, wear resistant, strong material chemically resistant to the conditions of an operating site. Accordingly, the surface sections can be discrete or can be processed integrally onto the outer surface of a rotatable shaft.

In a particularly preferred practical embodiment, the structural elements of a piece of chain are fabricated e.g. from steel. Further, in reference e.g. to FIGS. 3 and 5a, the back member 1c of a piece of chain is additionally provided with necessary attachment and adhesion surfaces, e.g. by way of perforations K or the like present therein.

The pivot points of e.g. steel-constructed pieces of chain are quite sturdy by virtue of the mutual straight contact surfaces of the side plates' linking portions. In addition, the stiffness of side plates can be increased by making the holes therein preferably through the use of die cutting technique by a punching or so-called pressing process. In this case, it is also further possible to make the attachment holes with stiffness-increasing collars inside the side plates and/or to attach the link bushings and the shafts of rotatable rollers into the holes in the side plates by laser welding, which stiffens remarkably the structure of a piece of chain so as to make possible its optimally thin wall thickness. Thereby is also made possible, as opposed to an integrally built piece of chain presented in FIGS. 2a-2c and 5b, to achieve improvement of stiffness for a piece of chain featuring side plates which are coupled to each other with a back or edge member fastened by welding. Thereby is also made possible to provide necessary attachment and engagement formations in view of e.g. chain bars, chain guards and the like mountable to the chain, without undermining the breaking strength of pieces of chain. It is by making use of sufficient "height differences" in the bearing surface of a piece of chain that good bracing is enabled e.g. for beam scrapers explicitly by positioning the beam scraper above a link pin present in the chain at a pivot point of the pieces of chain, at which point the force applied to the chain is at its maximum.

Depending on a type of service and conditions intended for a piece of chain, the structural metal components of the pieces of chain can be fabricated e.g. from conventional structural steel grades, acid-proof steel or stainless steel. Respectively, in the fabrication of surface sections for the rotatable rollers of pieces of chain can be used thermoplastics such as a common plastic (PE, PP), a technical plastic (PET, PMMA, PC, ABS+PC), a special plastic (PTFE), or thermosetting plastics (PUR, UP, EP, VE, PF, MF/AF), etc. Certain structural components of the pieces of chain, such as shafts, link pins, or surface sections, can of course be also fabricated from e.g. reinforced, composite plastic or ceramic materials, etc.

It is obvious that the invention is not limited to the above-presented or -described embodiments, but it can be subjected to quite considerable modifications as required each time by intended applications. Therefore, it is first of all clear that the pieces of chain of the invention, and the sub-assemblies included therein, can be manufactured from the most diverse of materials by using the most diverse of manufacturing techniques. It is also possible in the invention to replace rotatable rollers by using, instead, fixed sliding surfaces connectible to the side plates and covered e.g. with appropriate slide or wear coatings. On the other hand, as opposed to what has been described above, the drive notch included in the piece of chain can be positioned e.g. in connection with a so-called driving linking portion of the shaped part or more centrally on a bearing surface in the midsection of the shaped part. It is also possible and advisable in the invention to make use of a conical link bushing and link pin at successive pivot points of the pieces of chain, in which respect it may also be possible to provide the successive pivot points of the pieces of chain with link pins expanding in opposite directions. It is also possible to attach a link bushing to the side plates not by welding but e.g. by a threaded connection, to lock a link bushing to the yoke structure with a releasable threaded connection, or to fabricate the link pins or the shafts of rotatable rollers e.g. from appropriate materials so as to include e.g. a fastening feature enabling some type of releasable attachment.

The invention claimed is:

1. A piece of chain for use in a metal-constructed chain, such as a power transmission, conveyor chain and/or the like, the chain being composed of pieces of chain made up of lengthwise parallel side plates and connectible successively to each other by link pins at pivot points included in linking portions present at what are the opposite ends in its longitudinal direction, whereby the first pivot point established by the linking portions of the side plates of pieces of chain is a protrusion structure, and the second pivot point is a yoke structure external with respect to the protrusion structure when viewed in a transverse direction, each pivot point having a hole for constructing a continuous chain by placing the protrusion structure of a preceding piece of chain into engagement with the yoke structure of a following piece of chain with a lap joint and by placing a link pin in the hole, and the chain being intended to be operated by a drive assembly which includes at least one sprocket such as a drive, deflection pulley or the like, whereby in association with a bearing surface, present in a midsection of the chain-constructing piece of chain, is provided a notch substantially transverse relative to the chain traveling direction and including a recess comprising a leading edge and a trailing edge, and being, when the chain is being driven, in cooperation with substantially transverse mating surfaces included in the sprocket consistently with the successive notches of the chain, and wherein the piece of chain includes a supplementary arrangement for improving wear resistance of a chain drive, implemented with a chain composed of the pieces of chain, by reducing friction and/or surface pressure between the piece of chain and mating surfaces of the sprocket by means of an expanded contact surface, included at the notch and expanded in a direction substantially perpendicular to the chain piece, wherein the piece of chain comprises sheet metal-constructed side plates that make up an integral construction by way of a back member connecting the same on a side opposite to the bearing surface of the piece of chain and/or by way of an edge member connecting the linking portions of one end thereof, and that the supplementary arrangement is arranged in association with its opposite side plates by means of an expanded contact surface, included in the opposite side plates at the notch and expanded in a direction substantially perpendicular to the side plates, and/or by means of one or more rotatable rollers present in association with a leading edge of the notch in the piece of chain and/or in association with the piece of chain's bearing surface, wherein the one or more rollers are substantially equal in width to an interval transverse between the piece of chain's side plates, rotatable around the longitudinal axes thereof, and extending to engagement with the top edge of a substantially respective part of the side plates.

2. A piece of chain according to claim 1, wherein its end on the side of the protrusion structure comprises a link bushing fastened fixedly, most suitably by welding, to the opposite side plates for coupling successive pieces of chain to each other by means of a link pin capable of being rotatably engaged through the link bushing and locked to the yoke structure of a following piece of chain immovably in a transverse direction.

3. A piece of chain according to claim 1, wherein the piece of chain has its side plates, back member, edge member and/or contact surface constructed as a one-piece structure from thin sheet metal by bending.

4. A piece of chain according to claim 1, wherein one or more rollers are rotatable around the longitudinal axes thereof, comprising a surface section provided in a slide bearing-mounted manner on a shaft which is fixedly connected to the side plates.

5. A piece of chain according to claim 1, wherein one or more rollers are rotatable around the longitudinal axes thereof, comprising a surface section provided on a shaft which is rotatably connected to the side plates.

6. A piece of chain according to claim 4, wherein the surface section is fabricated most suitably from a plastic- or rubber-based, wear resistant, strong material chemically resistant to the conditions of an operating site.

7. A piece of chain for use in a metal-constructed chain, comprising:
pieces of chain made up of lengthwise parallel side plates and connectible successively to each other by link pins at pivot points included in linking portions at opposite ends in its longitudinal direction, whereby the first pivot point established by the linking portions of the side plates of pieces of chain is a protrusion structure, and the second pivot point is a yoke structure external with respect to the protrusion structure when viewed in a transverse direction, each pivot point having a hole for constructing a continuous chain by placing the protrusion structure of a preceding piece of chain into engagement with the yoke structure of a following piece of chain with a lap joint and by placing a link pin in the hole, and the chain being intended to be operated by a drive assembly which includes at least one sprocket, whereby in association with a bearing surface, present in a midsection of the chain-constructing piece of chain, is provided a notch substantially transverse relative to the chain traveling direction and including a recess comprising a leading edge and a trailing edge, and being, when the chain is being driven, in cooperation with substantially transverse mating surfaces included in the sprocket consistently with the successive notches of the chain, and wherein the piece of chain includes a supplementary arrangement for improving wear resistance of a chain drive, implemented with a chain composed of the pieces of chain, by reducing friction and surface pressure between the piece of chain and mating surfaces of the sprocket by means of an expanded contact surface, included at the notch of the piece of chain and expanded in a direction substantially perpendicular to the chain piece, wherein the piece of chain comprises sheet metal-constructed side plates that make up an integral construction by way of a back member connecting the same on a side opposite to the bearing surface of the piece of chain and by way of an edge member connecting the linking portions of one end thereof, and that the supplementary arrangement is arranged in association with its opposite side plates by means of an expanded contact surface, included in the opposite side plates at the notch of the piece of chain and expanded in a direction substantially perpendicular to the side plates, and by means of one or more rotatable rollers present in association with a leading edge of the notch in the piece of chain and in association with the piece of chain's bearing surface, wherein the one or more rollers are substantially equal in width to an interval transverse between the piece of chain's side plates, rotatable around the longitudinal axes thereof, and extending to engagement with the top edge of a substantially respective part of the side plates.

\* \* \* \* \*